United States Patent
Shinozaki et al.

(10) Patent No.: US 7,391,960 B2
(45) Date of Patent: Jun. 24, 2008

(54) DV FORMAT CAPABLE RECORDING AND REPRODUCTION DEVICE AND METHOD

(75) Inventors: Atsushi Shinozaki, Yokohama (JP); Junichi Hasegawa, Yokohama (JP)

(73) Assignee: Victor Company of Japan, Limited, Yokohama (JP)

( * ) Notice: Subject to any disclaimer, the term of this patent is extended or adjusted under 35 U.S.C. 154(b) by 922 days.

(21) Appl. No.: 10/733,517

(22) Filed: Dec. 12, 2003

(65) Prior Publication Data

US 2004/0131339 A1    Jul. 8, 2004

(30) Foreign Application Priority Data

Dec. 20, 2002    (JP)    ............... P2002-369453

(51) Int. Cl.
- H04N 5/91    (2006.01)
- H04N 7/00    (2006.01)
- H04N 5/00    (2006.01)
- H04N 11/02    (2006.01)
- H04N 5/04    (2006.01)

(52) U.S. Cl. ............... 386/96; 386/108; 386/124; 348/423; 348/500

(58) Field of Classification Search ............... 386/108, 386/96, 124; 348/423, 500
See application file for complete search history.

(56) References Cited

U.S. PATENT DOCUMENTS

| | | | | |
|---|---|---|---|---|
| 5,400,186 A | * | 3/1995 | Inoue et al. | 360/32 |
| 5,867,626 A | * | 2/1999 | Kawakami et al. | 386/108 |
| 5,907,656 A | * | 5/1999 | Oguro | 386/94 |
| 5,940,351 A | * | 8/1999 | Fujinami et al. | 369/30.04 |
| 5,963,703 A | * | 10/1999 | Higurashi et al. | 386/75 |
| 6,148,136 A | * | 11/2000 | Tanaka et al. | 386/46 |
| 2001/0026679 A1 | * | 10/2001 | Koshino et al. | 386/97 |

FOREIGN PATENT DOCUMENTS

| | | |
|---|---|---|
| EP | 0 797 196 A2 | 9/1997 |
| EP | 1 126 459 A2 | 8/2001 |
| JP | 2000-207199 | 7/2000 |

* cited by examiner

*Primary Examiner*—Thai Q. Tran
*Assistant Examiner*—Daquan Zhao
(74) *Attorney, Agent, or Firm*—The Nath Law Group; Jerald L. Meyer; Jonathan A. Kidney (57) ABSTRACT

Audio DIF blocks containing audio data and video DIF blocks containing video data are extracted by an audio/video extracting unit and respectively recorded in separate storage areas of an HDD. System data and audio auxiliary data are extracted by a system data reconstruction unit and thereafter recorded in a system data storage area of the HDD together with frame information generated by a frame information generating unit. The respective data items are recorded in these separate areas, while the audio auxiliary data is recorded together with the system data, and therefore it is easy to rewrite the data during an editing operation.

6 Claims, 5 Drawing Sheets

| MODE | NUMBER OF CHANNELS | DATA ALLOCATION | | QUANTIZATION |
|---|---|---|---|---|
| | | SEQUENCE 0 TO 4 | SEQUENCE 5 TO 9 | |
| 48/44.1/32kHz MODE | 2 | 1ch | 1ch | 16-bit LINEAR QUANTIZATION |
| 32kHz-4ch MODE | 4 | 2ch(MAIN) | 2ch(SUB) | 12-bit NON-LINEAR QUANTIZATION |

| SIGNAL NAME | DESCRIPTION | NORMAL VALUE (NTSC/PAL) |
|---|---|---|
| frame_err | WHETHER OR NOT THE NUMBER OF DIF BLOCKS IS NORMAL | 0/0 |
| packet_err | DISAGREEMENT DETECTED BETWEEN THE POSITION AND THE ID OF A DIF BLOCK | 0/0 |
| head_cnt | COUNT OF HEADER BLOCKS | 10/12 |
| sc_cnt | COUNT OF SUB-CODE BLOCKS | 20/24 |
| vaux_cnt | COUNT OF VAUX BLOCKS | 30/36 |
| audio_cnt | COUNT OF AUDIO BLOCKS | 90/108 |
| video_cnt | COUNT OF VIDEO BLOCKS | 1350/1620 |

DV FORMAT CAPABLE RECORDING AND REPRODUCTION DEVICE AND METHOD

BACKGROUND OF THE INVENTION

1. Field of the Invention

The present invention relates to a recording and reproducing device and a recording and reproducing method for recording and reproducing video and audio signals in the DV format in a disk recording medium such as a hard disc.

2. Description of the Related Art

VCRs having built-in cameras have been in widespread use as recording and reproducing devices for recording and reproducing video and audio signals in the DV format. Since video signals are compressed by an intra-frame encoding scheme in video and audio signals in accordance with this DV format, it is easy to make editing the respective frames. For the meantime, however, the information compression efficiency is low so that the resulting data amount per unit time tends to be large.

On the other hand, hard disk recorders and DVD recorders making use of a disk recording medium such as a hard disk, an optical disc and the like have been widely used as devices for recording and reproducing video and audio signals which are encoded and compressed in accordance with the MPEG (Moving Picture Experts Group) scheme. The video and audio signals in the MPEG format have been processed by an inter-frame compression encoding scheme and therefore the information compression efficiency is high resulting in a smaller data amount per-unit time. Accordingly, in most of stationary type recording and reproducing devices designed for recording and reproducing broadcast programs at home, the MPEG format is employed as a scheme for compressing and encoding video and audio signals.

In this manner, at the present, while the DV format has prevailed for recording and reproducing video and audio signals in video cameras, the MPEG format has prevailed for recording and reproducing video and audio signals in stationary type recording and reproducing devices. There are increasing demands for the ability to make use of a stationary recording and reproducing device for reproducing video and audio signals which are recorded by a video camera and copied to a stationary recording and reproducing device, and the ability to edit those video and audio signals by making use of the stationary recording and reproducing device.

In order to meet the demands, there are emerging stationary recording and reproducing devices capable of converting video and audio signals transmitted from a video camera through a digital interface such as IEEE1394 into corresponding video and audio signals in the MPEG format for recording, as disclosed in Japanese Patent Published Application No. 2001-94921.

Nevertheless, in the case where video and audio signals in the DV format are converted into video and audio signals in the MPEG format, while the storage capacity required for recording the video and audio signals can be saved, there is a problem that it is difficult to edit the video and audio signals in frame and impossible to perform a postrecording process.

Contrary to this, it can be considered to record a DIF stream without conversion of video and audio signals, which are transmitted from a video camera in the DV format, into video and audio signals in the MPEG format. However, the data structure of video and audio signals in the form of a DIF stream is not optimized for recoding on a disc, and therefore there is a problem that it is impossible to uniformly manage the system information, resulting in complicated processes when performing a postrecording process and so forth.

SUMMARY OF THE INVENTION

Taking into consideration the above problems, an object of the present invention is to provide a recording and reproducing device and a recording and reproducing method wherein, when recording video and audio signals in the DV format on a disk recording medium, the video and audio signals are converted in advance in a format suitable for recording on the disk.

In order to accomplish the above described objects, there is provided a recording and reproducing method device: an extracting unit for extracting audio data and video data in DIF blocks from an incoming DIF stream; a data reconstruction unit for extracting system data in DIF blocks from the DIF stream, extracting audio auxiliary data and reconstructing system data from the extracted data, as reconstructed system data, by eliminating unnecessary data from the extracted data; a recording and reproducing unit for recoding and reproducing the audio data as extracted by the extracting unit, the video data as extracted by the extracting unit and the system data as reconstructed by the data reconstruction unit respectively in an audio data area, a video data area and a system data area, which are separately allocated in a recording medium, in units of a predetermined data amount; and a combining unit for replacing the audio auxiliary data contained in the audio data by the audio auxiliary data contained in the reconstructed system data when combining the audio data, the video data and the reconstructed system data as reproduced by the recording and reproducing unit.

In accordance with a preferred embodiment of the present invention, the recording and reproducing device further comprises: a frame error detecting unit for detecting whether or not an error occurs in each frame in the DIF stream and outputting a detection result as error information; an error information embedding unit for embedding the error information output from the frame error detecting unit into the reconstructed system data as part thereof; an error information detecting unit for detecting the error information from the reconstructed system data as reproduced by the recording and reproducing unit; and an error flag rewriting unit for rewriting an frame error flag in the DIF stream when a frame error is detected by the error information detecting unit.

In accordance with a preferred embodiment of the present invention, the recording and reproducing unit stores and records the reconstructed system data corresponding to one DIF sequence in the DIF stream in a single recording block of the recording medium corresponding to the predetermined data amount.

Also, in order to accomplish the above described objects, there is provided a recording and reproducing method comprising: extracting audio data and video data in DIF blocks from an incoming DIF stream; extracting system data in DIF blocks from the DIF stream, extracting audio auxiliary data and reconstructing system data from the extracted data, as reconstructed system data, by eliminating unnecessary data from the extracted data; recoding and reproducing the audio data as extracted, the video data as extracted and the system data as reconstructed respectively in an audio data area, a video data area and a system data area, which are separately allocated in a recording medium, in units of a predetermined data amount; and replacing the audio auxiliary data contained in the audio data by the audio auxiliary data contained in the reconstructed system data when combining the audio data, the video data and the reconstructed system data as reproduced.

In accordance with a preferred embodiment of the present invention, the recording and reproducing method further comprises: detecting whether or not an error occurs in each frame in the DIF stream and outputting a detection result as error information; embedding the error information as output into the reconstructed system data as part thereof; detecting the error information from the reconstructed system data as reproduced; and rewriting an frame error flag in the DIF stream when a frame error is detected.

In accordance with a preferred embodiment of the present invention, the reconstructed system data corresponding to one DIF sequence in the DIF stream is stored and recorded in a single recording block of the recording medium corresponding to the predetermined data amount.

The nature, principle and utility of the invention will become more apparent from the following detailed description when read in conjunction with the accompanying drawings.

BRIEF DESCRIPTION OF THE DRAWINGS

In the accompanying drawings:

FIGS. 6A and 6B are views for explaining the allocation of sectors of audio DIF blocks wherein FIG. 6A shows the data of the audio data corresponding to one DIF sequence and FIG. 6B shows the data of the audio data corresponding to five DIF sequences;

DESCRIPTION OF THE PREFERRED EMBODIMENTS

In the following description, an embodiment of the present invention will be explained in accordance with a preferred example.

Figure 1:
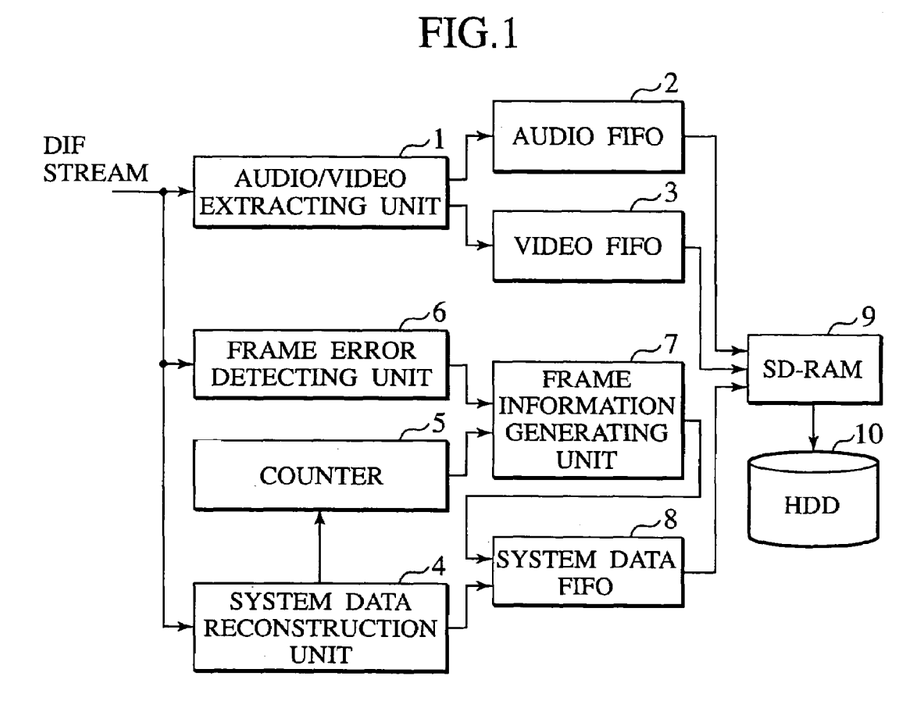
FIG. 1 is a view showing the configuration of the recording system of a recording and reproducing device in accordance with an embodiment of the present invention.
Figure 2:
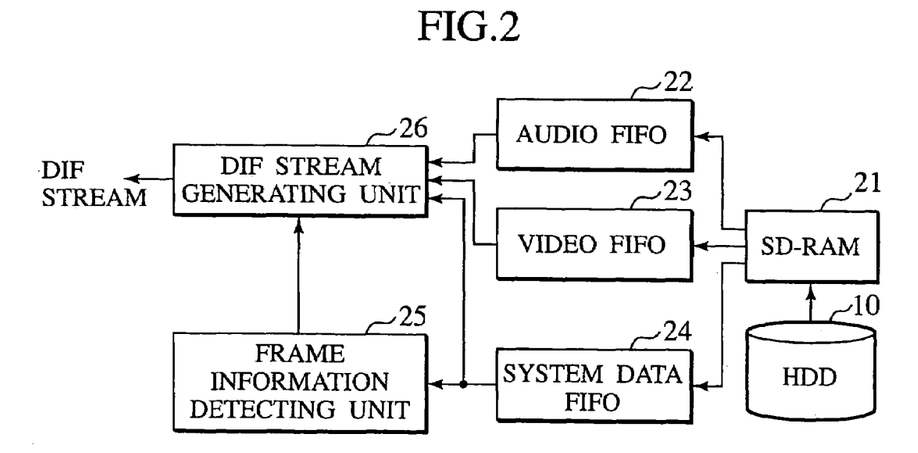
FIG. 2 is a view showing the configuration of the reproducing system of the recording and reproducing device in accordance with the embodiment of the present invention.

FIG. 1 is a view showing the configuration of the recording system of a recording and reproducing device in accordance with an embodiment of the present invention. FIG. 2 is a view showing the configuration of the reproducing system of the recording and reproducing device in accordance with the embodiment of the present invention. Incidentally, this embodiment as described here is a recording and reproducing device which serves to record, in a hard disk drive (HDD), video and audio signals in the DV format as transferred from an external apparatus as a DIF stream and reproduce the video and audio signals from the HDD.

Figure 3:
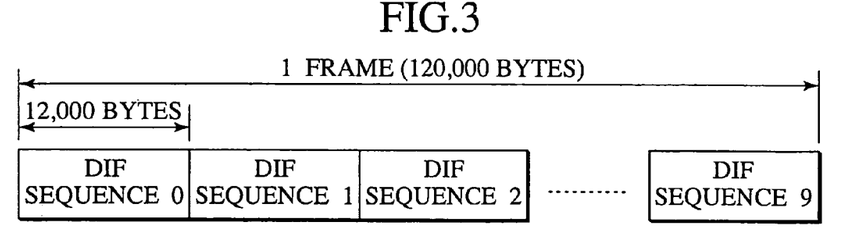
FIG. 3 is a diagram showing the structure of one frame of the video and audio signals output from a 525/30 system (525 lines and 30 frames per second).
Figure 4:
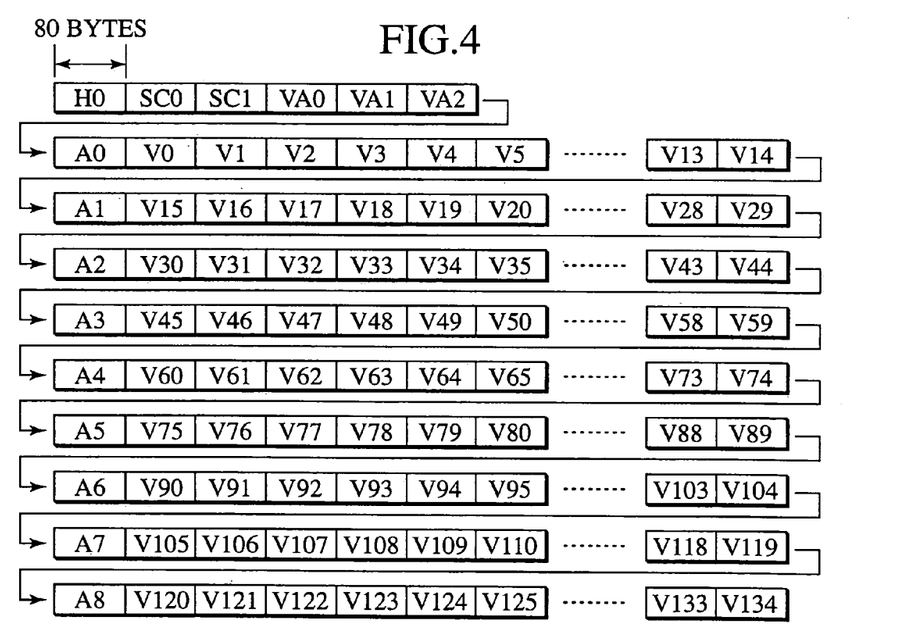
FIG. 4 is a diagram showing the structure of one DIF sequence.
Figure 5:
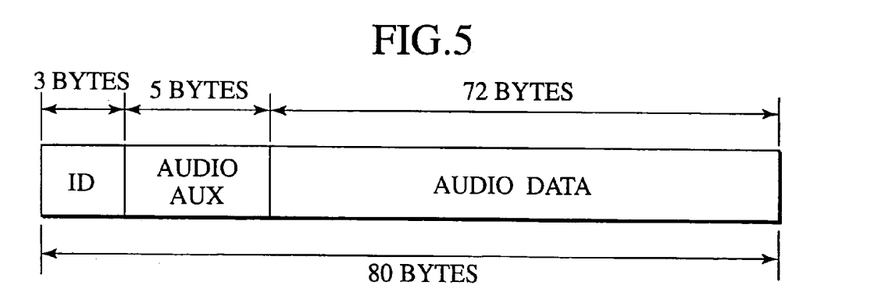
FIG. 5 is a diagram showing the structure of one audio DIF block.

On the other hand, FIG. 3 through FIG. 5 are schematic views showing the data structure of a DIF stream input to the recording and reproducing device in accordance with this embodiment, wherein FIG. 3 shows the structure of one frame of the video and audio signals output from a 525/30 system (525 lines and 30 frames per second); FIG. 4 shows the structure of one DIF sequence of the stream; and FIG. 5 shows the structure of one audio DIF block containing the audio data of the sequence.

First, the data structure of the DIF stream input to the recording and reproducing device in accordance with this embodiment will be explained with reference to FIG. 3 through FIG. 5. One frame data output from a 525/30 system is composed of ten DIF sequences (0 to 9), as illustrated in FIG. 3, each sequence being composed of data of 12,000 bytes.

One DIF sequence is composed of 150 DIF blocks in total, each of which is 80 byte data, wherein the leading block of the DIF sequence is a header DIF block (H0); the next two blocks are sub-code DIF blocks (SC0, SC1); the further next three blocks are video auxiliary DIF blocks (VA0 to VA2); and the remaining 144 blocks are audio DIF blocks (A0 to A8) and video DIF blocks (V0 to V134). As illustrated in FIG. 4, after the video auxiliary DIF block (VA2), one audio DIF block is inserted just before each 15 video DIF blocks.

The video data and the video auxiliary data are distributed and stored in the video auxiliary DIF blocks (V0 to V134) and the video auxiliary DIF blocks (VA0 to VA2) respectively. However, the audio data and the audio auxiliary data are stored only in the audio DIF blocks, as shown in FIG. 5, while there is provided no particular block for storing the audio auxiliary data corresponding to the video auxiliary DIF blocks for storing the video auxiliary data. Incidentally, within an audio DIF block, the leading 3 bytes are used to store an ID; the next 5 bytes are used to store audio auxiliary data; the remaining 72 bytes are used to store audio data.

Although not shown in the figure, each of the data structures of the other DIF blocks than the audio DIF block includes leading 3 bytes which is used to store an ID with which it is possible to identify the type of the DIF block, the DIF sequence number, the DIF block number and so forth.

Next, the configuration of the recoding system of the recording and reproducing device in accordance with this embodiment as shown in FIG. 1 will be explained. In the figure, numeral 1 designates an audio/video extracting unit for detecting the ID of each DIF block (Digital Interface Format block) in an input DIF stream and extracting audio DIF blocks and video DIF blocks from this DIF stream. Numeral 2 designates an audio FIFO for storing the audio DIF blocks as extracted by the audio/video extracting unit 1. Numeral 3 designates a video FIFO for storing the video DIF blocks as extracted by the audio/video extracting unit 1.

Also, numeral 4 designates a system data reconstruction unit for detecting the ID of each DIF block in the input DIF stream, extracting from this DIF stream a header DIF block (H0), sub-code DIF blocks (SC0, SC1), video auxiliary DIF blocks (VA0 to VA2) and audio DIF blocks (A0 to A8) and reconstructing the data as extracted. Numeral 5 designates a counter for counting the number of the DIF blocks as extracted by the system data reconstruction unit 4 separately for the respective DIF block types.

Furthermore, numeral 6 designates a frame error detecting unit for counting the number of the DIF blocks per frame in synchronism with strobe signals which can be detected together with the DIF stream, and detecting an error in the number of the DIF blocks. Numeral 7 designates a frame information generating unit for generating frame information on the basis of the count number counted by the counter 5 and the error detecting result detected by the frame error detecting unit 6.

Still further, numeral 8 designates a system data FIFO for storing the system data reconstructed by the system data reconstruction unit 4 and the frame information as generated by the frame information generating unit 7. Numeral 9 designates an SD-RAM for storing for storing the data sequentially read out respectively from the audio data FIFO 2, the video data FIFO 3 and the system data FIFO 8. Numeral 10 designates an HDD 10 for writing the data read out from the SD-RAM 9 on a magnetic disk in sectors of 512 bytes.

Next, the operation of the recoding system of the recording and reproducing device will be explained. When receiving the DIF stream as shown in FIG. 4 from an external source, the audio/video extracting unit 1 extracts audio DIF blocks (A0 to A8) and video DIF blocks (V0 to V134) from this DIF stream, and outputs the audio DIF blocks (A0 to A8) to the audio FIFO 2 and the video DIF blocks (V0 to V134) to the video FIFO 3 respectively.

The audio DIF blocks stored in the audio FIFO 2 and the video DIF blocks stored in the video FIFO 3 are transferred to the SD-RAM 9 respectively in blocks. When the data transferred from a plurality of DIF blocks are accumulated in the SD-RAM 9, the data is read out from the SD-RAM 9 to the HDD 10 in units of 512 bytes in order to record the data in the recording medium of the HDD 10.

Figure 6A:
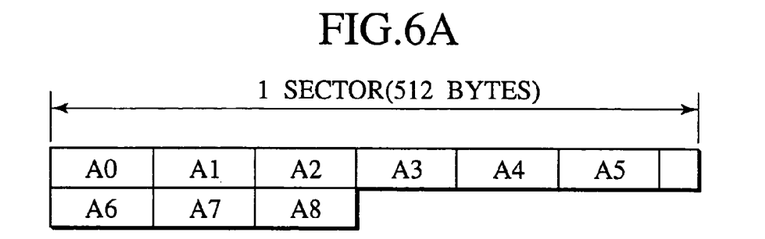
Figure 6B:
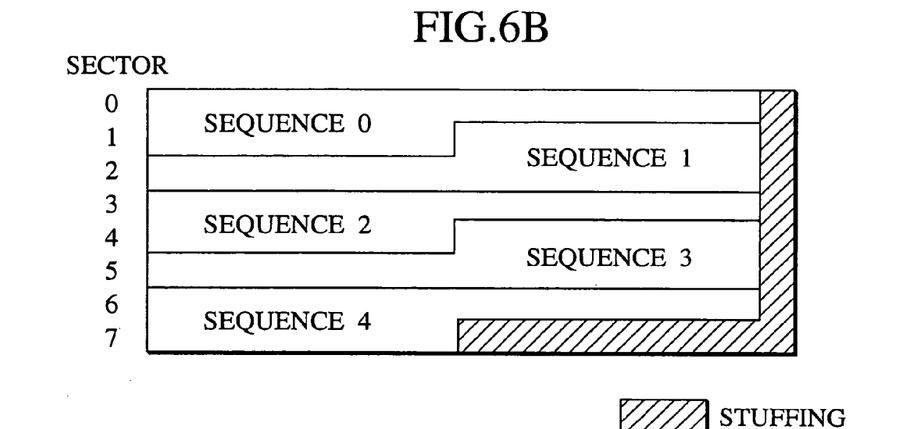

FIGS. 6A and 6B are views for explaining the data of the audio DIF block as stored in the HDD 10 through the audio FIFO 2 and the SD-RAM 9 wherein FIG. 6A shows the data of the audio data corresponding to one DIF sequence and FIG. 6B shows the data of the audio data corresponding to five DIF sequences. In this case, one DIF sequence contains nine audio DIF blocks in total as described above and therefore all the blocks cannot be stored in one sector.

Six audio DIF blocks are then stored in one sector. However, since the data amount of six audio DIF blocks is 80×6 (=480) bytes which is under 512 bytes. Accordingly, the six audio DIF blocks is concatenated with stuffing data, totaling to 512 bytes, and then transferred to the HDD 10 through the SD-RAM 9.

The remaining three audio DIF blocks are stored in the next sector together with the leading three audio DIF blocks of the subsequent DIF sequence, while the remaining six audio DIF blocks of the subsequent DIF sequence are stored in the further next sector. While the audio DIF blocks of two DIF sequences can be stored in three sectors on the recording medium in this manner, eight sectors on the recording medium are allocated to the audio DIF blocks of each five DIF sequences.

The audio DIF blocks after the allocation of sectors are stored in the recording medium of the HDD 10. The allocation of sectors is performed also to the video DIF block for storing in the recording medium of the HDD 10. Incidentally, there are allocated separate areas respective for storing audio data, video data and system data in order that the audio DIF blocks are stored in the audio data storing area while the video DIF blocks are stored in the video data storing area.

Figure 7:
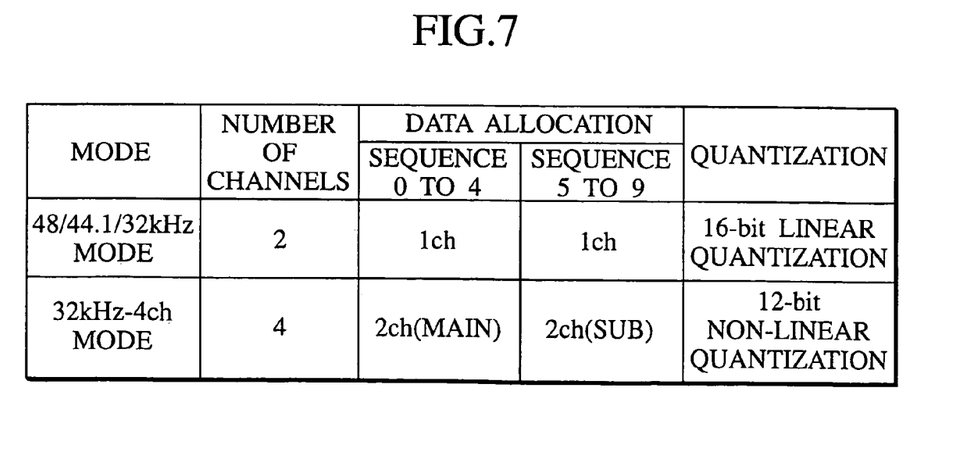
FIG. 7 is a diagram showing an audio signal format.

On the other hand, as illustrated in FIG. 7, the audio signal format of the DV format includes a 2-channel mode in which 16-bit linear quantization is performed at 48 kHz, 44.1 kHz or 32 kHz and a 4-channel mode in which 12-bit non-linear quantization is performed at 32 kHz. In the 2-channel mode, for example, the data of the respective right and left channels are assigned respectively to the sequences 0 to 4 and the sequences 5 to 9. On the other hand, in the 4-channel mode, the main data of the respective right and left channels are assigned to the sequences 0 to 4 while the subordinate data of the respective right and left channels are assigned to the sequences 5 to 9. The audio DIF blocks of the sequences 0 to 4 and the audio DIF blocks of the sequences 5 to 9 are stored in separate storage areas in the audio data storage area of the recording medium.

On the other hand, the system data reconstruction unit 4 detects the IDs of the respective DIF blocks in-the incoming DIF stream and extracts a header DIF block (H0), sub-code DIF blocks (SC0, SC1), video auxiliary DIF blocks (VA0 to VA2) and audio DIF blocks (A0 to A8). The system data reconstruction unit 4 then extracts only necessary data from the DIF blocks for recording in the recording medium of the HDD 10.

Figure 8A:
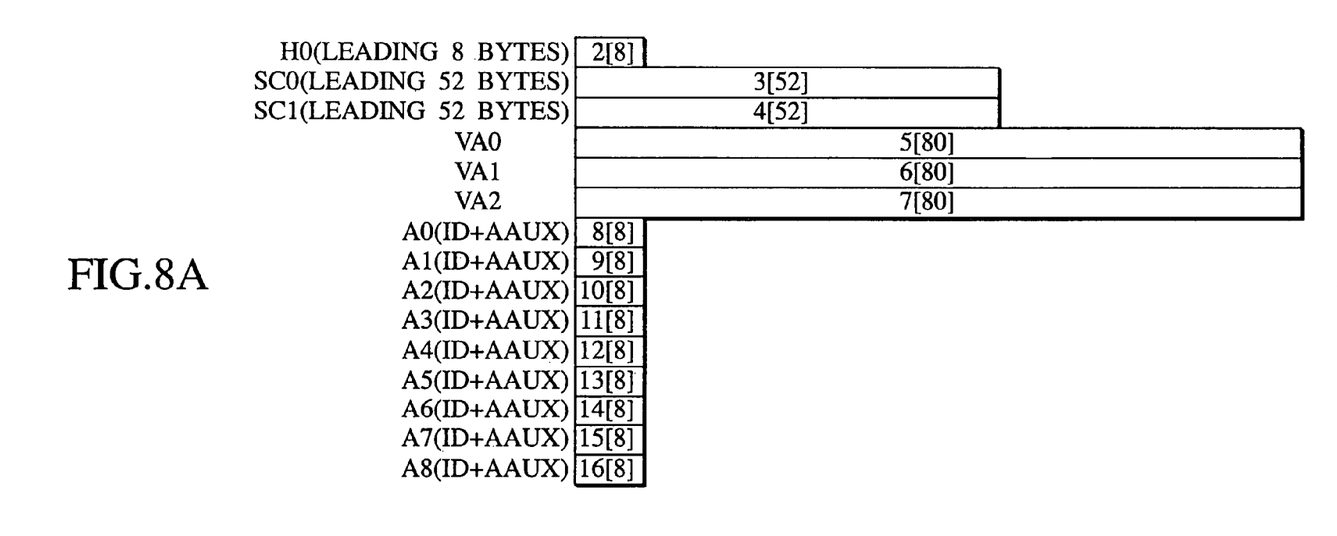
FIG. 8A is a view showing the detailed configuration of the data extracted by a system data reconstruction unit.

FIG. 8A is a view showing the detailed configuration of the data extracted by the system data reconstruction unit 4. The data comprises the leading 8 bytes of the header DIF block (H0), the leading 52 bytes of each of the sub-code DIF blocks (SC0 and SC1), and the leading 8 bytes of each of the audio DIF blocks (A0 to A8), i.e., the 3 byte ID and the 5 byte audio auxiliary data as shown in FIG. 5. The remaining 72 bytes of the header DIF block (H0) and the remaining 28 bytes of each of the sub-code DIF blocks (SC0 and SC1) are mainly reserved data and therefore not extracted.

On the other hand, with respect to the video auxiliary DIF blocks (VA0 to VA2), all the data of the DIF blocks are extracted. The data items as extracted from each DIF block are given serial numbers 2 to 16 with the respective byte lengths in parentheses in FIG. 8A. The data as extracted is sequentially output to the system data FIFO 8.

The counter 5 serves to count the number of the DIF blocks as extracted by the system data reconstruction unit 4 separately for the respective DIF block types, and output the count numbers to the frame information generating unit 7 when each frame is counted up. Also, the frame error detecting unit 6 serves to count the number of the DIF blocks in synchronism with strobe signals which can be detected together with the DIF stream, and detect whether or not the number of the DIF blocks is normal.

Figure 8B:
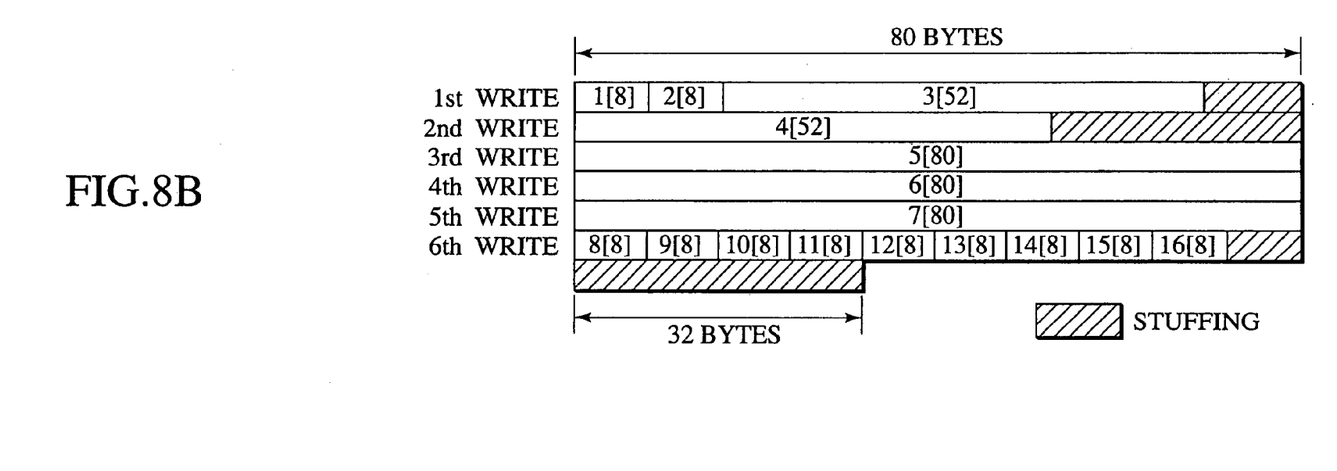
FIG. 8B is a diagram showing the data structure of the system data formed within a SD-RAM in units of 512 bytes.
Figure 9:
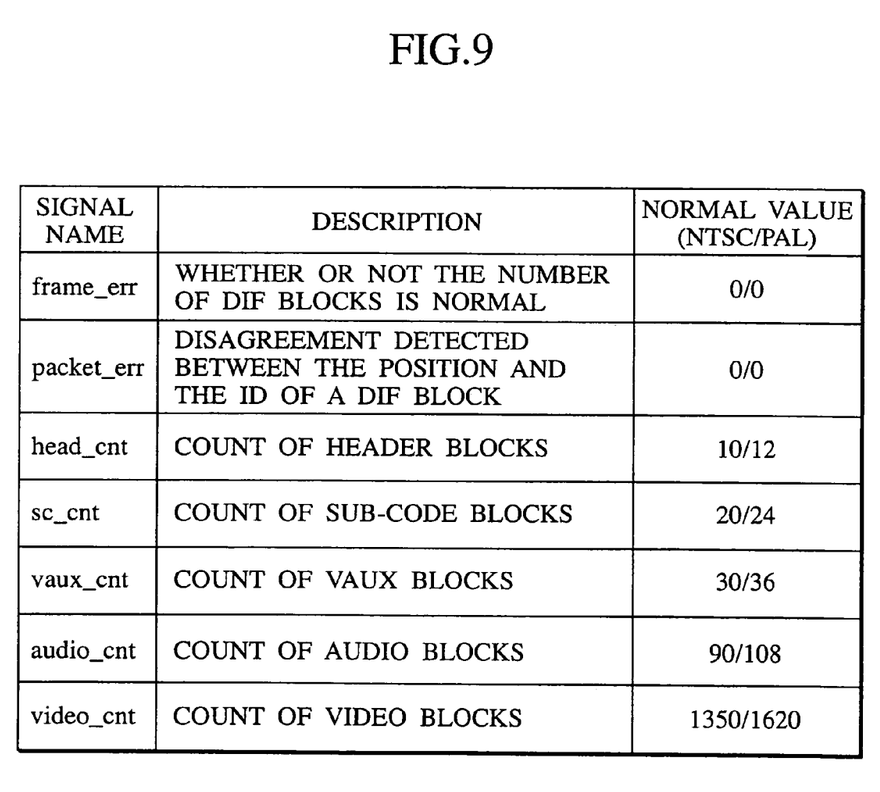
FIG. 9 is a diagram showing an example of frame information as generated by the recording and reproducing device during a recording operation in accordance with the embodiment of the present invention.

The frame information generating unit 7 generates frame information as illustrated in FIG. 9 on the basis of the detection result from the frame error detecting unit 6 and the output signal from the counter 5, and outputs the frame information to the system data FIFO 8. The frame information as generated by the frame information generating unit 7 as illustrated in FIG. 9 is written to the system data FIFO 8 together with the extracted data of the system data reconstruction unit 4 as illustrated in FIG. 8A. At this time, the data outputting timing is suitably adjusted for the system data reconstruction unit 4 and the frame information generating unit 7 in order that the image data as illustrated in FIG. 8B is formed in the SD-RAM 9, to which data is output from the system data FIFO 8 in units of 80 bytes.

FIG. 8B shows the data structure of the system data formed within the SD-RAM 9 in units of 512 bytes including an 8-byte leading data item 1 which contains the frame information as generated by the frame information generating unit 7. The subsequent data items 2 to 16 are corresponding to the data items 2 to 16 as illustrated in FIG. 8A, whereas stuffing data is inserted into the shaded portions in FIG. 8B.

Incidentally, the frame information is information which can be generated from the entirety of each frame as described above and therefore generated only after receiving the entirety of each frame. Accordingly, in FIG. 8B, if the data items 2 to 16 are extracted from the DIF sequence 0 of a certain frame, the data item 1 indicates the frame information of the preceding frame. There is no frame information to be added to the system data of the DIF sequences 1 to 9 so that stuffing data is inserted to the data item 1 shown in FIG. 8B with respect to the DIF sequences 1 to 9.

Then, 80 byte data is transferred from the system data FIFO 8 to the SD-RAM 9 for six times to transfer 480 byte data in total. Incidentally, since the net data amount to be transferred is under 80 bytes during the first, second and sixth data transmission from the system data FIFO 8 to the SD-RAM 9, stuffing data is added to the net data totaling to 80 bytes.

Also, since the total data amount of the data transmission for six times is under 512 bytes, stuffing data of 32 bytes is added to the data during the writing operation to the SD-RAM 9 in order that form 512 byte record image data. The image of record data as generated in this manner is written to a system data storing area of the recording medium in the HDD 10.

As described above, in accordance with the recording and reproducing device of this embodiment, audio DIF blocks and video DIF blocks are extracted from a DIF stream incoming from an external source and separately recorded in the audio data recording area and the video data recording area respectively. Furthermore, the system data thereof is recorded in the system recording area by adding the frame information after reconstruction.

Next, the configuration of the reproducing system of the recording and reproducing device in accordance with this embodiment will be explained with reference to FIG. 2. In the figure, numeral 10 designates the HDD 10 for reading out audio DIF blocks and video DIF blocks together with system data from the recording medium in which the data is recorded. Numeral 21 designates an SD-RAM to which data is written from the HDD 10 in units of 512 bytes.

Numeral 22 designates an audio data FIFO for storing audio DIF blocks which are read out from the SD-RAM 21 in blocks. Numeral 23 designates a video FIFO for storing video DIF blocks which are read out from the SD-RAM 21 in blocks. Numeral 24 designates a system data FIFO for storing system data which is read out from the SD-RAM 21 in units of 80 bytes.

Incidentally, while the SD-RAM 21, the audio FIFO 22, the video FIFO 23 and the system data FIFO 24 are provided separately from those of the recoding system as shown in FIG. 1 in this case, it is also possible to share these memories between the recoding system and the reproducing system.

Furthermore, numeral 25 designates a frame information detecting unit for detecting frame information as read from the system data FIFO 24. Numeral 26 designates a DIF stream generating unit for generating a DIF stream by combining audio DIF blocks as read from the audio FIFO 22, video DIF blocks as read from the video FIFO 23 and system data as read from the system data FIFO 24.

In what follows, the operation of the reproducing system of the recording and reproducing device in accordance with the present invention will be explained. When reproducing the video and audio signals recorded in the recording medium of the HDD 10, the audio DIF blocks as read from the audio data recording area is output to the audio FIFO 22 through the SD-RAM 21 while the video DIF blocks as read from the video data recording area is output to the video FIFO 23 through the SD-RAM 21.

Also, the system data as read from the system data recording area is output to the system data FIFO 24 through the SD-RAM 21. The system data is transferred between the SD-RAM 21 and the system data FIFO 24 in units of 80 bytes. The frame information detecting unit 25 detects frame information from the data as read from the system data FIFO 24 and outputs the detection result of this frame information to the DIF stream generating unit 26.

First, on the basis of the data as read from the system data FIFO 24, the DIF stream generating unit 26 recovers a header DIF block (H0), sub-code DIF blocks (SC0, SC1), and video auxiliary DIF blocks (VA0 to VA2) corresponding to one DIF sequence as shown in FIG. 4.

Then, the audio DIF blocks as read from the audio FIFO 22 and the video DIF blocks as read from the video FIFO 23 are arranged in order as shown in FIG. 4, wherein the leading 8 bytes, i.e., the 3 byte ID and the 5 byte audio auxiliary data as shown in FIG. 5, of the respective audio DIF blocks (A0 to A8) are replaced by the data as read from the system data FIFO 24. That is, the data items 8 to 16 as illustrated in FIG. 8 are used to substitute for the leading 8 bytes of the respective audio DIF blocks (A0 to A8) as read from the audio FIFO 22 to reconstruct a DIF sequence.

If no frame error is found as a result of detecting frame information by the frame information detecting unit 25, the reconstructed DIF stream is output, as it is, to the external apparatus, an internal DV decoder and the like. Contrary to this, if a frame error is found, a flag is set to indicate the frame error in the DIF stream. Accordingly, after receiving this DIF stream, the internal decoder or the external apparatus can fix the error, for example, by concealing the erroneous frame with the previous frame.

As described above, in accordance with the recording and reproducing device of this embodiment, audio data, video data and system data are extracted respectively from a DIF stream and collectively recorded in dedicated areas provided for exclusive use in storing the respective data. On the other hand, while the leading 8 bytes of each of the audio DIF blocks, i.e., the 3 byte ID and the 5 byte audio auxiliary data are redundantly recorded in both the audio data recording area and the system data recording area, those recorded in the audio data recording area are overwritten with those recorded in the system data recording area when reproducing.

Accordingly, when the video and audio signals recorded in the recording medium of the HDD 10 are edited, the audio data, the video data and the system data can be edited within the respective areas and therefore it is possible to simplify the editing procedure.

Also, when recording in the 4-channel mode as shown in FIG. 7 in accordance with the recording and reproducing device of this embodiment, the data of the main two channels and the data of the subordinate two channels are recorded in separate areas. Accordingly, for example, the subordinate two channels can be edited or dubbed by rewriting the data in the area, where the audio DIF blocks of these subordinate channels are recorded, and the audio auxiliary data, i.e., the data items 8 to 16 as shown in FIG. 8B, and therefore it is possible to simplify the procedure including a postrecording process.

While a 525/30 system is described in the above embodiment, the present invention can be applied also to a 625/25 system. In the case of a 625/25 system (PAL:625 lines and 50 fields per second), one frame contains 12 DIF sequences (0 to 11) totaling to the data amount of 12,000×12=144,000 bytes. However, the data structure of one DIF sequence is exactly identical to that as shown in FIG. 4 and therefore the above description is applicable to the PAL case in regard to the extracting operation in the system data reconstruction unit 4 and the frame information generating operation in the frame information generating unit 7.

In accordance with the present invention, audio data, video data and system data as extracted from a DIF stream are recorded respectively in separate areas of a recording medium, while video auxiliary data is recorded as part of the system data, and therefore it is possible to simplify the editing procedure.

It should be understood that many modifications and adaptations of the invention will become apparent to those skilled in the art and it is intended to encompass such obvious modifications and changes in the scope of the claims appended hereto.

What is claimed is:

1. A recording and reproducing device comprising:
   an extracting unit for extracting audio data and video data in DIF blocks from an incoming DIF stream;
   a data reconstruction unit for detecting identifiers of the DIF blocks in the incoming DIF stream, extracting, from the DIF stream, leading predetermined number of bytes of header DIF block, leading predetermined number of bytes of sub-code DIF block, a video auxiliary DIF block, and leading identifier and audio auxiliary data of audio DIF block, and reconstructing the extracted data as reconstructed system data;
   a recording and reproducing unit for recoding and reproducing said audio data as extracted by said extracting unit, said video data as extracted by said extracting unit and said system data as reconstructed by said data reconstruction unit respectively in an audio data area, a video data area and a system data area, which are separately allocated in a recording medium, in units of a predetermined data amount; and
   a combining unit for replacing said audio auxiliary data contained in said audio data by said audio auxiliary data contained in said reconstructed system data when combining said audio data, said video data and said reconstructed system data as reproduced by said recording and reproducing unit;
   wherein, upon carrying out a postrecording process of said audio data, the recording and reproducing unit rewrites said audio data of the audio DIF block recorded in the audio data area and said audio auxiliary data recorded in the system data area.

2. The recording and reproducing device as claimed in claim 1 further comprising:
   a frame error detecting unit for detecting whether or not an error occurs in each frame in said DIF stream and outputting a detection result as error information;
   an error information embedding unit for embedding the error information output from said frame error detecting unit into said reconstructed system data as part thereof;
   an error information detecting unit for detecting said error information from said reconstructed system data as reproduced by said recording and reproducing unit; and
   an error flag rewriting unit for rewriting an frame error flag in said DIF stream when a frame error is detected by said error information detecting unit.

3. The recording and reproducing device as claimed in claim 1 wherein said recording and reproducing unit stores and records said reconstructed system data corresponding to one DIF sequence in said DIF stream in a single recording block of said recording medium corresponding to said predetermined data amount.

4. A recording and reproducing method comprising:
   extracting audio data and video data in DIF blocks from an incoming DIF stream;
   detecting identifiers of the DIF blocks in the incoming DIF stream, extracting, from the DIF stream, leading predetermined number of bytes of header DIF block, leading predetermined number of bytes of sub-code DIF block, a video auxiliary DIF block, and leading identifier and audio auxiliary data of audio DIF block, and reconstructing the extracted data as reconstructed system data;
   recoding and reproducing said audio data as extracted, said video data as extracted and said system data as reconstructed respectively in an audio data area, a video data area and a system data area, which are separately allocated in a recording medium, in units of a predetermined data amount; and
   replacing said audio auxiliary data contained in said audio data by said audio auxiliary data contained in said reconstructed system data when combining said audio data, said video data and said reconstructed system data as reproduced,
   wherein, upon carrying out a postrecording process of said audio data, said audio data of the audio DIF block recorded the audio data area and said audio auxiliary data recorded in the system data area are rewritten.

5. The recording and reproducing method as claimed in claim 4 further comprising:
   detecting whether or not an error occurs in each frame in said DIF stream and outputting a detection result as error information;
   embedding the error information as output into said reconstructed system data as part thereof;
   detecting said error information from said reconstructed system data as reproduced; and
   rewriting an frame error flag in said DIF stream when a frame error is detected.

6. The recording and reproducing method as claimed in claim 4 wherein said reconstructed system data corresponding to one DIF sequence in said DIF stream is stored and recorded in a single recording block of said recording medium corresponding to said predetermined data amount.

* * * * *